US011232369B1

(12) United States Patent
Li et al.

(10) Patent No.: US 11,232,369 B1
(45) Date of Patent: Jan. 25, 2022

(54) TRAINING DATA QUALITY FOR SPAM CLASSIFICATION

(71) Applicant: Facebook, Inc., Menlo Park, CA (US)

(72) Inventors: Hongyang Li, Mountain View, CA (US); Yuchun Tang, Freemont, CA (US)

(73) Assignee: Facebook, Inc., Menlo Park, CA (US)

( * ) Notice: Subject to any disclaimer, the term of this patent is extended or adjusted under 35 U.S.C. 154(b) by 941 days.

(21) Appl. No.: 15/698,797

(22) Filed: Sep. 8, 2017

(51) Int. Cl.
*G06N 20/00* (2019.01)
*G06Q 50/00* (2012.01)

(52) U.S. Cl.
CPC ............. *G06N 20/00* (2019.01); *G06Q 50/01* (2013.01)

(58) Field of Classification Search
CPC ........... G06Q 50/01; G06N 3/08; G06N 20/00
See application file for complete search history.

(56) References Cited

U.S. PATENT DOCUMENTS

| 9,699,129 | B1* | 7/2017 | Nelken | H04L 51/22 |
| 2004/0167964 | A1* | 8/2004 | Rounthwaite | G06Q 10/107 |
| | | | | 709/206 |
| 2004/0177110 | A1* | 9/2004 | Rounthwaite | H04L 51/12 |
| | | | | 709/202 |
| 2005/0120019 | A1* | 6/2005 | Rigoutsos | H04L 51/12 |
| 2006/0031318 | A1* | 2/2006 | Gellens | G06Q 10/107 |
| | | | | 709/206 |
| 2009/0248497 | A1* | 10/2009 | Hueter | G06Q 30/00 |
| | | | | 705/7.29 |
| 2011/0035451 | A1* | 2/2011 | Smith | G06Q 10/107 |
| | | | | 709/206 |
| 2012/0102130 | A1* | 4/2012 | Guyot | H04L 51/12 |
| | | | | 709/206 |
| 2012/0215861 | A1* | 8/2012 | Smith | G06Q 10/107 |
| | | | | 709/206 |
| 2014/0172989 | A1* | 6/2014 | Rubinstein | G06Q 50/01 |
| | | | | 709/206 |
| 2017/0005962 | A1* | 1/2017 | Lewin-Eytan | H04L 51/12 |
| 2017/0372206 | A1* | 12/2017 | Kavadiki | G06Q 10/04 |

OTHER PUBLICATIONS

Lam et al. (A Learning Approach to Spam Detection based on Social Networks, Aug. 2007, pp. 1-9) (Year: 2007).*

* cited by examiner

*Primary Examiner* — George Giroux
(74) *Attorney, Agent, or Firm* — Baker Botts L.L.P.

(57) ABSTRACT

In one embodiment, a method includes accessing posts in a social-networking system. Each of the posts is unlabeled with respect to whether the post is known to be spam. The method also includes determining a posting user who submitted the post to the social-networking system and a recipient user to whom the post is addressed. The method further includes determining a first vector representation of the posting user and a second vector representation of the recipient user based on one or more features associated with the post, the posting user, and the recipient user. The method still further includes comparing the vector representations and building a machine learning model for automatically detecting spam posts in the social-networking system using a subset of the plurality of posts as non-spam training data.

20 Claims, 5 Drawing Sheets

TRAINING DATA QUALITY FOR SPAM CLASSIFICATION

TECHNICAL FIELD

This disclosure generally relates to spam classification systems.

BACKGROUND

Messaging applications, social networks, and other interactive websites often receive unsolicited spam content from advertisers or other users abusing or misusing content sharing features of the particular forum. Several methods have evolved to identify and remove spam content from other content posted in accordance with the forum's regulations (referred to herein as "ham" content). For example, a website may employ personnel that monitor the site for offending spam content, manually verifying that the content is indeed inappropriate and deleting the content. As another example, users of a site may self-report offending spam content. Frequently reported content may accrue negative feedback from several users and eventually be flagged for employee review so that the offending nature of the content can be verified and eventually removed from the site. This data can be used as training data to train machine learning algorithms that classify content as spam or ham.

Traditional methods of spam detection and removal can be inefficient or impractical. For example, large interactive websites can receive many millions of content posts each day. The website may not be able to employ enough personnel to manually review each piece of content, or such an endeavor may be cost-prohibitive. Moreover, self-reported content may be highly inaccurate. Self-reported content may be content that is reported by users of an interactive website as containing illicit content such as unauthorized advertisements, bullying, offensive content, or otherwise inappropriate content. For example, self-reported spam may contain many legitimate content posts but may accrue negative feedback because reporters may not agree with the content of the post (e.g., politically charged content may receive negative feedback from those who hold opposing views). Self-reported content may also leave out many spam posts that don't receive enough views from users to accrue a meaningful amount of negative feedback. For example, if only 1 out of 100 users report spam, the post may have to be seen by at least 200 viewers (on average) to receive even two negative feedback reports.

SUMMARY OF PARTICULAR EMBODIMENTS

In particular embodiments, posts in a social-networking system are accessed and information regarding each post is discovered. These posts can often be seen by one or more other users of the social-networking system, for example, in order to facilitate interactions between users of the social-networking system. In particular embodiments, one or more posting and/or recipient users are determined with respect to each post. For example, a posting user posts a content item to a recipient user's profile page. As another example, a posting user posts a content item to a news feed. As another example, a posting user posts a content item to a page associated with a particular group. In particular embodiments, an embedding for each posting and recipient user or entity is determined. For example, the embedding may encode numerous features or attributes that describe the posting or recipient user or entity. For example, an embedding may include a vector representation that, for purposes of comparison, encode features or behaviors of a user or account holder. The embeddings of one user may be used for comparison with other embeddings or embedding vectors that encode behaviors of other users or account holders. In particular embodiments, the embeddings are indicative of a relationship between the posting user and the recipient user. In particular embodiments, the embeddings are compared using some set of established criteria to identify accounts that have a propensity to post ham or spam. For example, certain patterns in the distribution of embeddings in a multi-dimensional or n-dimensional mapping or embedding space may identify accounts that are more likely than not to post spam data. For example, outlying embeddings may be determined based on a distribution of the embeddings in the embedding space. Any combination of embedding values may be used to identify outlying embeddings and corresponding users or account holders that are likely to post spam data. In particular embodiments, a filter is applied to the embedding space to filter out noisy or outlying embeddings. In particular embodiments, a machine learning model is built using the subset of remaining embeddings. For example, feature vector representations may be created for each post or posting or recipient user that is associated with each remaining embedding after the noisy or outlying embeddings are removed from the dataset. The machine learning model, once trained, may be used to identify spam posts in the future with or without manual review.

In particular embodiments, an unsupervised machine learning algorithm can be used as a pre-processing operation in a multilayer classification system to filter spam content from ham training data or identify spam content. This may result in increased accuracy of content classifiers that are trained on the resulting data. For example, the multilayer classification system may involve application of two or more processing steps. For example, one step may identify content posts that are likely to receive negative user feedback, or content that is likely to be self-reported content. The identified content from this step may not actually have any negative user feedback associated with it, but may have feature vector attributes that are similar to historical posts or content that have been given negative user feedback in the past. In particular embodiments, spam training data is filtered from ham training data using algorithms trained on historical data by creating feature vectors for each entry in the historical data set. For example, spam can be pruned from ham training data by creating a d-dimensional feature vector space to plot feature vector representations of labels, n-grams, or posts (content) of users from the training data. The content in a data set of posts associated with negative user feedback (herein referred to as "NFX" data) can be modeled with a deep learning algorithm using the d-dimensional feature vector space. For example, feature vectors can be created for each piece of content in both real-time posts and historical NFX or self-reported posts. A machine learning algorithm is trained on the historical NFX content to identify other likely NFX content in the unlabeled set. Similarities between features can be identified and posts in the real-time data set having similar attributes to the NFX data can be identified. In particular embodiments, a second classification step is used to identify actual spam data from the likely NFX data using verified and labeled training data. For example, labeled spam posts are used as training data to train a machine learning algorithm to identify the labeled spam posts in a dataset of identified NFX data.

The embodiments disclosed herein are only examples, and the scope of this disclosure is not limited to them.

Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
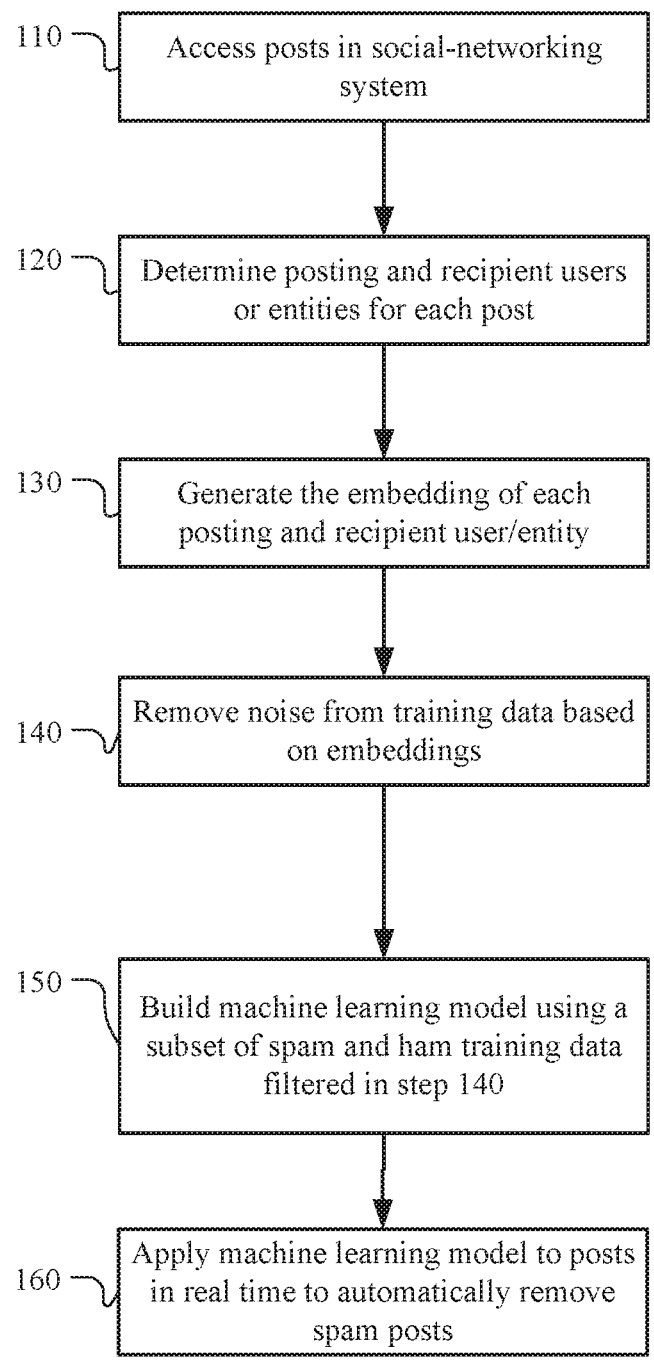
FIG. 1 illustrates an example method for improving training data for ham or spam classifiers.

Websites, social-networks, blogs, message boards, and email services routinely receive spam content in the form of messages, interactions, invitations, or the like. The sheer volume of content distributed on these types of sites makes post-distribution detection of spam content highly difficult and resource intensive. For example, manual processes for detection of spam content may be effective but may result in timely review of a relatively small subset of total content made available on such sites. Moreover, committing to manual review of any meaningful percentage of content distributed on these sites may represent a prohibitively large cost without regard to the amount of time between the potential spam content is posted and when it is removed. Conventional automatic processes for reviewing spam content are notoriously inaccurate. For example, an automatic process for detecting spam content without human review may be programmed using inaccurate data and existing algorithms may focus on the content of the post relevant to a topic of discussion. But removing content merely because it appears to an algorithm to be unrelated to a given topic often results in removing too much content and raises concerns regarding freedom of speech and stifles progress of discussions that raise new issues.

Pre-distribution censorship of posters is often reserved for known spammers. For example, such a tactic may be employed in cases where a known spammer controls an account. Such a procedure requires a high level of confidence about the intentions of the account holder in order to avoid frustrating well-intentioned users. Such a technique may be overly restrictive on its own for regulating the large numbers of new spam accounts that are created daily. Moreover, when spammers take control of an existing account, the account's historical behavior makes classification of the account as a spam account more difficult.

Machine learning algorithms may be used to automatically detect and/or remove spam content or spam users (i.e., users that are associated with spam content distribution) with little human review, feedback, or monitoring. For example, machine learning algorithms can be trained on a set of spam or non-spam training data in order to detect spam posts in real-time or general user posts. These algorithms may be trained to classify a given content as spam or ham using a set of training data that includes labeled spam and/or ham data. In particular embodiments, these machine learning algorithms may require some labeled training data. For example, the labeled training data may be feature vector representation of spam or non-spam posts. A feature vector may be generated based on a variety of attributes of a post or the posting or recipient user account. For example, such attributes may include: a number of posts that the account has generated; a length of time that the account has been established; whether verification procedures have been satisfied by the account holder; the number of reciprocal posts or interactions that the user has received; profile information; social-networking history and/or social-graph information; and/or any other type of information attributable to a particular user or account. In particular embodiments, the data used for generating a feature vector may also include relationship data between a posting user and a recipient user. For example, such data may include: a total number of interactions between a posting and recipient user; interactions by the posting user with other users; interactions by the recipient user with the posting user; interactions by the recipient user with other users; negative feedback associated with either the posting or recipient user; interactions between the posting and/or recipient user and his/her/its first degree connections or the connections of the counterpart poster or recipient; reciprocal communications (e.g., reply messages, reply comments, reply "likes", and the like); a number of times each user has re-shared (e.g., linked to, re-posted, re-tweeted, etc.) a post; and/or other interactions or metrics for one or more of a posting or recipient user. These feature vector representations describing spam or non-spam posts are then used as training data for a machine learning algorithm.

The more accurate the training data (e.g., the more the training data matches the labeled characteristic), the better the output of the algorithm. Often, training data can include misclassified content. For example, unreported spam posts may account for some meaningful percentage of a data set of posts that have not been reported by any user. A machine learning algorithm trained on such data may have a significant error rate due to the unlabeled nature of the "unreported" data. For example, some posts in the "unreported" set may be spam posts but may not have triggered a user to report that post as spam yet. Thus, methods of improving non-spam training data quality and removing spam samples mixed in that non-spam data are required in order to improve the training data and build more reliable classifiers.

As another example, not enough manually labeled data is created on a daily basis to train the spam classifiers with precision. Other errors also arise with manually labeled data. For example, content that has been explicitly given negative feedback as spam by users (referred to as NFX content herein) may, in fact, primarily be ham or genuine user content. Some estimate that the actual number of spam content in the NFX datasets is around 7-10%. Thus, an NFX dataset may contain between 9-14 times more ham data than spam data, even though every data within the NFX dataset was explicitly reported by users as containing spam. In particular embodiments, this NFX data may be relied on to train classifiers. However, classifier accuracy may suffer as a result of inaccurately labeled training data.

In particular embodiments, an unsupervised machine learning algorithm filters users that post spam ("spammers") from non-spammers. The posts from these identified spammers can then be used to train content classifiers. In particular embodiments, an unsupervised algorithm may compare features of a content poster to those of a viewer/recipient of the content to predict whether the content is likely spam. Conceptually, since a spam poster may share very little in common with a spam recipient (e.g., different geographic locations, background, circle of friends, social-network activity pattern, etc.), significant differences between a content poster and a recipient may signal the likelihood of the content being spam.

Of particular concern are advancing techniques of spam posters that are on the cutting edge of spam detection facilities. For example, understanding the text-based detection techniques used to automatically tag and remove spam posts from content sharing sites, spam posters have moved to less detectable methods of distributing nefarious or advertising content. For example, some spammers have moved to embedding pictures as posts or profile images with hidden messages that are not easily detectable by text analysis tools. These images may escape unfiltered through traditional spam detection techniques. As another example, accounts may be established as a form of spamming in and of themselves. For example, the spam post in this context may be the actual friend request itself. For example, if the spam account's profile picture contains an image with hidden text that is not easily processed by optical character recognition techniques, the friend request becomes the post because the profile picture is displayed to the recipient of the post. For example, the name and other attributes of the profile may seem relatively normal as compared to other new account users. Moreover, existing accounts can be hijacked and their profile picture can be altered by the hacker in order to relay a spam message. Thus, in this spam strategy, the spam message may be relayed to the user by virtue of the recipient logging into the system and viewing his or her friend requests. Historically, this has not been a traditional platform for distributing or receiving spam and thus has evaded primary focus of many spam detection facilities.

With reference to FIG. 1, a flowchart of a method 100 for improving spam and/or ham training data is illustrated in accordance with a non-limiting embodiment of the present disclosure. At step 110, posts in a social-networking system are accessed. In particular embodiments, information regarding each post is discovered. For example, a social-networking system contains various pages that are associated with entities, concepts, users, organizations, groups, and the like. Each page may have one or more interfaces that allow users to interact with content on the page. For example, a user profile page may have a "wall" that allows users to share content items, including text, video, links, images, and other content items with that user. As another example, a group may have a message board that allows members of the group to communicate. As another example, a social-networking system creates news-feeds of related content that are customized for each user based on a variety of factors. User-posts may appear in a news-feed based on connections between the posting user and the viewing user, even if the post is seemingly unrelated to the viewer. As another example, a private message between users is considered a post. As another example, any communication of content between users of a social-networking system is considered a post. Companies, organizations, charities, and other entities can also register for accounts on the social-networking system and post and receive content items through the system.

In particular embodiments, a social-networking system, website, message board, news aggregator, blog, or other forum for sharing content is associated with one or more computer systems that may analyze, moderate, and control content posted to the particular forum. For example, specialized processes for crawling a content sharing website may be developed. These processes may execute on related and/or unrelated (with respect to the servers hosting the content) servers or computing devices. In particular embodiments, these specialized processes may access one or more posts of the content sharing site as described in step 110 of FIG. 1. In particular embodiments, selected posts and/or all posts published to the content sharing site are sent to one or more specialized internal or external systems for processing before or after being published. For example, posts may be analyzed before being published in order to prevent spam content from being posted. As another example, all content is posted but is simultaneously or later reviewed by the analysis processes described herein. In particular embodiments, "access" may refer to investigating various sources associated with the post, such as information regarding users associated with the post by way of direct interaction with the post or in any other manner.

At step 120, a posting and/or recipient user is determined. By way of explanation, posts can generally be viewed by one or more other users of a forum, for example, in order to foster interactions between those users. For example, a social-networking system hosts news feeds by aggregating general posts from its users and preparing a customized list of posts to share with each particular user. In this example, the user viewing the post may be considered the recipient. For example, this may include the user whose news feed this post was published to or aggregated for. As another example, the post may be displayed to a user who has searched the site for particular keywords. This searching user may also be considered a recipient user. As another example, a blog contains a series of blog entries and often contains a comments section in which users are encouraged to post content items and engage in discussions. In this example, the blog post may be considered the recipient user or account. In addition or alternative, the commenter that a comment is posted in response to may be considered the recipient. In particular embodiments, one or more posting and/or recipient users are determined with respect to each post. For example, a posting user posts a content item to a recipient user's profile page. As another example, a posting user posts a content item to a news feed. As another example, a posting user posts a content item to a page associated with a particular group. Posts can be public, private, or have some set of viewing permissions established for it (e.g., first degree connections only, users mentioned in the post only). Moreover, posts can have established reply criteria associated with them. For example, a user may specify that only first degree connections are allowed to comment on his or her post, while any user of the social-networking system may view the post.

At step 130, embeddings are generated. In particular embodiments, an embedding of each posting and/or recipient user or entity is generated. For example, the embedding may encode numerous features or attributes that describe the posting or recipient user or entity. In particular embodiments, a multi-dimensional or d-dimensional space may be an embedding space. The embedding space may be a low-dimensional space relative to the dimensions of the information it represents. For example, one or more "embeddings" or "embedding vectors" plotted within an embedding space may be vector representations that, for purposes of comparison, encode features or behaviors of a user or account holder. The embeddings of one user may be used for comparison with other embeddings or embedding vectors that encode behaviors of other users or account holders. For example, a model for mapping a user's information to an embedding space may be trained so that if two users have similar interests (e.g., tend to join similar groups, like similar pages, comment on posts of similar topics, etc.), then their distance in the embedding should be close, compared to two users who have few shared interests. A user's embedding may be comprised of uninterpretable or unidentifiable values (e.g., a series of real numbers) that, when compared to the embedding of another user, provide a measure of similarly between the two users. When plotted in an embedding space, the distance between embeddings within the embedding space may describe the propensity of the users (represented by each embedding) to join similar groups, like similar pages, comment on posts of similar topics, etc. The distance between each user may reflect their propensity to behave in a similar manner. However, the embeddings themselves may be comprised of complex (e.g., otherwise uninterpretable) values. For example, for a 128-dimension embedding vector, each value of the 128 dimension value vector may, in and of itself and without reference to other corresponding values, not be interpretable on its own. This characteristic of embeddings may differ from feature vectors. For example, each attribute of feature vectors may correspond to a quantifiable attribute of a user's behavior, such as a number of comments the user has posted in a particular group, a number of photo uploads the user has initiated, etc. By way of example comparison only, a value in an embedding vector may not describe such readily quantifiable attributes.

At step 140, noise is removed or filtered from the data set based on the embeddings. In particular embodiments, the embeddings are compared using a set of established criteria to identify associated accounts that have a propensity to post ham or spam. For example, certain patterns in the distribution of embeddings in a multi-dimensional or d-dimensional mapping space may be used to identify accounts that are more likely than not to post spam data. As explained above, similarity between embeddings (e.g., those close together in the mapping space) may indicate that the associated accounts have similar characteristics.

In particular embodiments, ham or spam data may comprise a minority in a given dataset. For example, in a set of spam training data, 95% of the embeddings may describe spam posts or associated users, while 5% of the embeddings may describe ham posts or associated users. As another example, in a set of ham training data, 95% of the embeddings may describe ham posts or associated users, while 5% of the embeddings may describe spam posts or associated users. Leveraging this data characteristic, a filtering system may use outlier analysis or anomaly-detection algorithms to weed out the small proportion of noise in the datasets. To find the outliers and anomalies, the algorithm may use the aforementioned embeddings, which are generated so that similar data (e.g., user account characteristics) would be close to each other in the embedding space. Accordingly, a distribution of the embeddings may be generated so that the majority posts are defined as being contained in one or more particular regions of the embedding space. For example, a clustering algorithm, such as a kMeans clustering algorithm, may be used to divide the training data into k different clusters. In particular embodiments, the "noise" may be defined as the minority posts or small, distant clusters (e.g., either ham posts in a spam training data set or spam posts in a ham training data set). Such noise may be removed from the dataset. Those of ordinary skill in the art will appreciate the wide range of algorithms that can be used to attenuate or filter outlying or noisy data from data sets.

Understanding that often spam is the minority of posts, an algorithm (e.g., isolation forest, K Nearest Neighbors or KNN) may be applied to the embeddings to determine outlying posts and flag these as noise in the dataset. For example, a general distribution of the embeddings can be established wherein most of the embeddings are within a set of bounds within the embedding space. Other embeddings, which may be considered outliers, may fall outside the bounds of the majority of the embeddings within the embedding space. In particular embodiments, the outlying vectors may correspond to spam posts in a predominantly ham dataset because of the relatively odd or unusual behavior of the poster as exemplified by his or her embedding representation.

In particular embodiments, a distance threshold is determined as a filter on a multi-dimensional embedding space. The thresholds and distance algorithms contemplated by the present disclosure may be applied to embeddings and further include application on the embedding spaces described herein. The distance between points in the embedding space may represent similarities or differences between the corresponding users. Points falling outside of the filter are determined to be outliers and thus spam. These points are either (1) removed from a ham training dataset and/or (2) saved to form a spam training dataset. In particular embodiments, the distance threshold is determined with respect to a reference point. In particular embodiments, the reference point may be a point representation of a d-dimensional embedding vector that represents an entity that the content is associated with (e.g., a spam poster's vector may be compared to a spam recipient's vector, which may serve as the reference point). In particular embodiments, the reference point may be defined based on a cluster of similar vectors using cluster analysis. Since the dataset contains predominantly regular users, the clusters would represent clusters of regular, non-spammer, users. In particular embodiments, an embedding may represent content and data associated with the content. An anomaly or outlier detection algorithm may be used in a similar manner as described above to identify noise (e.g., spam in a ham dataset).

In particular embodiments, embeddings may be generated for a data set that describes users, such as, for example, the posting and/or recipient users for a given post, or other users that viewed or have access to view the post. In this example, actions or relationships of the user may be used to generate the embeddings. Since it is assumed that spam posters are the minority in a ham dataset, identifying outliers in the dataset (e.g., using isolation forests or comparing spam posters to recipients) may be an effective way to identify spam posters and the spam they post. Thus, if the user (e.g., potential spammer) is determined to be beyond a threshold distance from the reference points (e.g., a post recipient or a cluster of users who presumably are regular users) within the embedding space, the user may be classified as a spammer and may be removed or added to a set of training data as desired.

In particular embodiments, a clustering algorithm may identify clusters of similar embedding vectors represented within an embedding space so that the majority of vectors are within the identified clusters. A distance filter may be defined to identify vectors that are outside those clusters. For example, a known percentage of spam to ham data can be used to create the distance filter so that a certain number or proportion of similar content items are within the filter. In particular embodiments, a threshold distance around each reference point (e.g., center of a cluster) may define a cluster of similar vectors. Outliers that do not fall within the threshold in the d-dimensional space may be considered as spam or related to spam. In particular embodiments, this spam content can be purged from the ham training data. As yet another example, generic outlier/anomaly detection algorithms (e.g., isolation forest) can also be used to identify spam outlier data in the NFX data. In particular embodiments, distance between vectors may be computed using cosine similarity.

At step 150, a machine learning model is built. In particular embodiments, the machine learning model is built using the subset of ham or spam training data filtered in step 140. For example, after purging any identified spam data from a ham training data set, the ham training data set can be used to more effectively train a machine learning algorithm to identify ham posts. The machine learning model, once trained, may be used to identify ham or spam posts in the future with or without manual review. As mentioned above, machine learning algorithms can also be trained to identify spam data. Spam algorithms are trained to identify spam in data sets using training data that includes confirmed spam data. However, certain spam training data may contain ham data in addition to the desired spam data. The method described above may also be used to purge ham data from the spam dataset.

In certain embodiments, the machine learning model is built by creating feature vectors that are indicative of attributes of the posting or recipient user for the filtered dataset of ham or spam posts. For example, the features may indicate a number of posts that the account has generated. In addition or alternative, the features or attributes of the vector may indicate a length of time that the account has been established. In addition or alternative, the features or attributes of the vector may indicate whether verification procedures have been satisfied by the account holder. In addition or alternative, the features or attributes of the vector may indicate the number of reciprocal posts or interactions that the user has received. In addition or alternative, the features or attributes of the vector may indicate profile information. In addition or alternative, the features or attributes of the vector may indicate social-networking history and/or social-graph information. In addition or alternative, the features or attributes of the vector may indicate any other type of information attributable to a particular user or account.

In particular embodiments, the features or attributes may be indicative of one or more relationships between the posting user and the recipient user. For example, an attribute or feature may describe a total number of interactions between a posting and recipient user. In addition or alternative, an attribute or feature may describe interactions by the posting user with other users. In addition or alternative, an attribute or feature may describe interactions by the recipient user with the posting user. In addition or alternative, an attribute or feature may describe interactions by the recipient user with other users. In addition or alternative, an attribute or feature may describe negative feedback associated with either the posting or recipient user. In addition or alternative, an attribute or feature may describe interactions between the posting and/or recipient user and his/her/its first degree connections or the connections of the counterpart poster or recipient. In addition or alternative, an attribute or feature may describe reciprocal communications (e.g., reply messages, reply comments, reply "likes", and the like). In addition or alternative, an attribute or feature may describe a number of times each user has re-shared (e.g., linked to, re-posted, re-tweeted, etc.) a post. Various other interactions or metrics can be measured and tracked as features for one or more of a posting or recipient user.

In particular embodiments, a machine learning model may be trained to classify a given post that has received negative feedback (e.g., NFX data) on a social-networking system as actually being spam or not spam. Such a model may be trained using verified spam data and NFX data. Such a model, however, requires a post to be first flagged before it is classified as being spam or not (i.e., it takes NFX data as input). Training of such a model may also be delayed since collecting a sufficient amount of current NFX training data may be time consuming. The time delay may be undesirable, as the spam may be consumed by users during that time. To address this, in particular embodiments a multi-layer machine learning models may be used. A first machine learning model may be trained to predict whether a given post would likely receive negative feedback (e.g., flagged as NFX data), and the second machine learning model may be trained to predict whether a given predicted NFX post (e.g., as output by the first model) is spam or ham. The first machine learning model may be trained using a collection of post data (e.g., non-NFX) and NFX data, and the second machine learning model may be trained using predicted NFX data output by the first model and human-verified spam data. In particular embodiments, the second machine learning model may use the predicted NFX data as a source of ham training data, since it has been observed that NFX data is predominantly ham. However, since NFX data may contain spam (e.g., 7-10%), the process described above may be used to purge spam data from the dataset. As a result, a dataset with a higher concentration of ham data may be generated. In particular embodiments, the identified/purged spam data may further be used as part of the spam training dataset for the second model, along with or in lieu of the aforementioned human-verified spam training data. In particular embodiments, rather than purging the spam data from the ham training dataset, the feature vectors may alternatively be input into the machine learning model (e.g., a neural network) to allow the machine learning model to automatically learn whether any difference or degree of difference between a pair of vectors provides any predictive signal. Instead of inputting the actual vectors into the model, particular embodiments may input a cosine similarity value measuring the similarity/difference between a pair of vectors to achieve the same objective.

The multi-layer model eliminates or reduces the time limitations associated with acquiring a robust set of NFX training data (to be used during training) and/or waiting for NFX data to be flagged before the spam filtering process is triggered during operation. For example, instead of needing to wait waiting for content to receive negative feedback from users, the multi-layer classifier may be trained to (1) identify content that will likely receive negative feedback, and (2) predict whether it is likely spam or not. In particular embodiments, the classifier is executed on users to identify users that are associated with spam posts. Further, performance of the model may be improved by improving the underlying training data. This may be achieved by purging spam training data from content with negative feedback to generate a purer ham training dataset. Even small amounts of spam data present in ham training data can throw off the machine learning algorithm. In particular embodiments, the spam identified through the purging process may be used as a spam training dataset for the second machine learning model. This may be used along with or in lieu of human-verified spam data. The set of human-verified spam data may be too small to use to train automated algorithms. Moreover, the human-verified data may take too long to verify and incorporate into training data and thus may not be a reliable source of spam training data. Speed is especially important for spam filtering technology, since, for example, spammers may adopt new techniques at a pace that evades such a process. Thus, reliance on human-verified training data may expose users to unacceptable amounts of spam.

At step 160, the machine learning model is applied. In particular embodiments, the model is applied to posts in real-time or near real-time. For example, the model can be applied to posts before the system allows them to be posted to the system. As another example, the model is applied while posts are viewable in the system. In particular embodiments, a post purgatory can be established where users are not able to interact with posts until they are reviewed by a spam classifier. For example, interactive content within the post may be disabled until the system has determined that the post is free and clear of spam or harmful or deleterious content.

Figure 2:
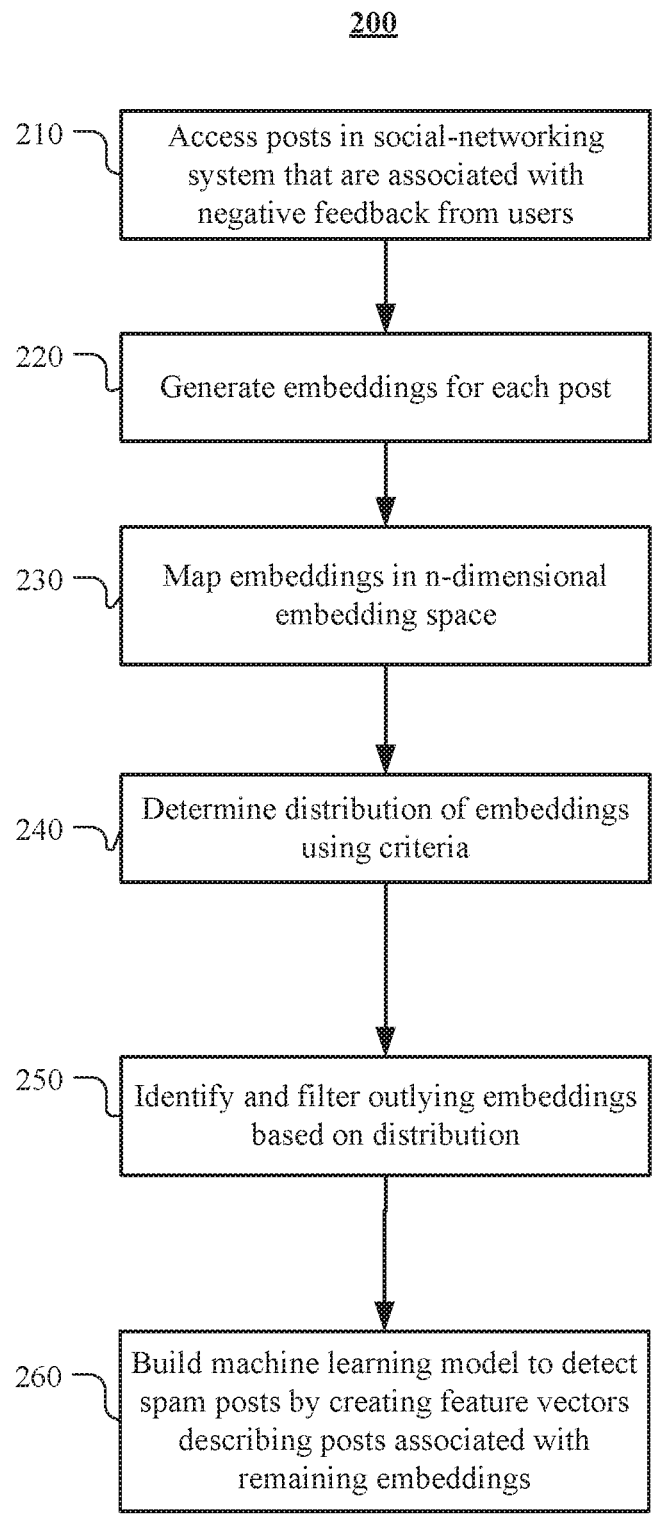
FIG. 2 illustrates an example method for improving training data for ham or spam classifiers.

With reference to FIG. 2, a flowchart of a method 200 for improving spam and/or ham training data is illustrated in accordance with a non-limiting embodiment of the present disclosure. At step 210, actual or predicted NFX posts, or posts that are associated with some sort of negative feedback input are accessed. For example, NFX posts may be posts for which a user has down-voted, reported, or otherwise indicated contains spam or content that is otherwise not appropriate, not related to, or otherwise not worthy of remaining viewable on the content sharing site. For example, while it is known that many users report valid spam data, other users use these reporting features to report content that the particular user does not agree with. Thus, often, the NFX data includes mostly appropriate, ham, or non-spam data. However, at least some of the posts reported in the NFX data set include actual spam posts. The processing described below may isolate this spam data in order to identify attributes or features that generally describe ham or spam data for use in improving training data sets of a machine learning model or algorithm that automatically detects spam posts.

At step 220, embeddings are generated for each user associated with a post. For example, embeddings may be generated in the same or a similar manner as is described above with respect to general posts (e.g., not NFX data posts) in step 110 in the flowchart of FIG. 1. For example, features or attributes that describe the post itself and/or the poster, recipient, relationships between them, and other aspects of the post can be used to generate an embedding for the posting or recipient user. The embeddings may not be interpretable with respect to the one or more particular features that each embedding value is associated with, but may be useful in comparison with other embeddings that quantify the same type of association with respect to another user. As described above, in contrast with a feature value that may describe a particular number of "likes" that a post has received, an embedding may describe a more complex set of characteristics of the post, such as actions of the posting or recipient user, a ratio of particular metrics, or a relative assessment of some aspect of the post.

At step 230, the users associated with each post are mapped in a d-dimensional mapping or embedding space. For example, the embedding space may be of d dimensions, wherein each dimension in the set of d is reserved for a particular one of the embedding values in the embedding. For example, users may be mapped to a high dimensional space, and the embeddings may result from the mapping. For example, the embedding may be a function of the user.

At step 240, a distribution of embeddings is determined. For example, embeddings representing or describing the attributes, relationships, interactions, and other information regarding the NFX posts are plotted in a d-dimensional embedding space. At step 250, outlying embeddings are identified based on the distribution. In particular embodiments, an algorithm is created or used to identify these outlying embeddings. In particular embodiments, generalities regarding outlying embeddings and associated content can be identified and used to automatically identify other spam data for use in training a machine learning algorithm.

At step 260, a machine learning model for predicting whether a given content is likely to be NFX content is trained on feature vectors associated with a training data set of actual NFX data. The algorithm is then run on the desired set of content to identify a set of likely NFX content. The likely NFX content is then combined with confirmed spam content in order to train a second classifier to identify spam posts. The likely NFX content, similar to actual NFX content, may include predominantly ham data. Therefore, in particular embodiments the likely NFX content may be processed as described above to extract spam data. The extraction process may provide a ham training dataset and/or a spam training dataset. The extracted training data from this approach (i.e., from like NFX content) may be much larger and more robust than content that might otherwise receive enough negative feedback to register as training data (i.e., actual NFX content). For example, if a post is required to receive 5 negative feedback inputs from other users before it is included as training data, and if typically only 1 out of every 200 users actually report spam, then the potentially spam post may need to be viewed by 1000 users of the system to trigger the threshold. Spam content that is not encountered by 1000 users may never be reported or included in the training data. Thus, this approach ensures the training data set includes all spam posts, even posts that are not popular.

This approach may also reduce the time that spam posts are presented to users. Using the above example, immediate detection and incorporation of the post that is likely to receive negative feedback may result in its removal before that post would otherwise have been detected as being associated with negative feedback. For example, if it typically takes 1 day for content to receive 1000 views (the hypothetical number of users required to view content before the threshold 5 negative feedback inputs is received), the immediate incorporation of this content into the training data set may enable the system to classify this post as spam within minutes of it being posting. Thus, the spam content may be removed or deleted before hundreds of users that may otherwise encounter the spam content view it.

In particular embodiments, a multi-layer classification technique increases the number of spam training data posts. As described above, NFX data often contains numerous non-spam posts that are not suitable for use as training data in a machine learning algorithm. Moreover, manually reviewing all NFX posts in a large content sharing platform is not sustainable. In particular embodiments, a multi-layer classification technique classifies posts as NFX data based on a set of historical NFX training data feature vectors. For example, feature vectors are created that describe historical NFX data. These feature vectors are used to train a machine learning algorithm to identify potential NFX posts, or posts that are likely to be tagged with some sort of negative user feedback. Once potential NFX posts are identified, a separate machine learning algorithm can identify actual spam posts within the NFX data set. For example, manually labeled and confirmed spam posts can be used as training data to train a machine learning algorithm to identify spam posts in the potential NFX dataset.

Figure 3:
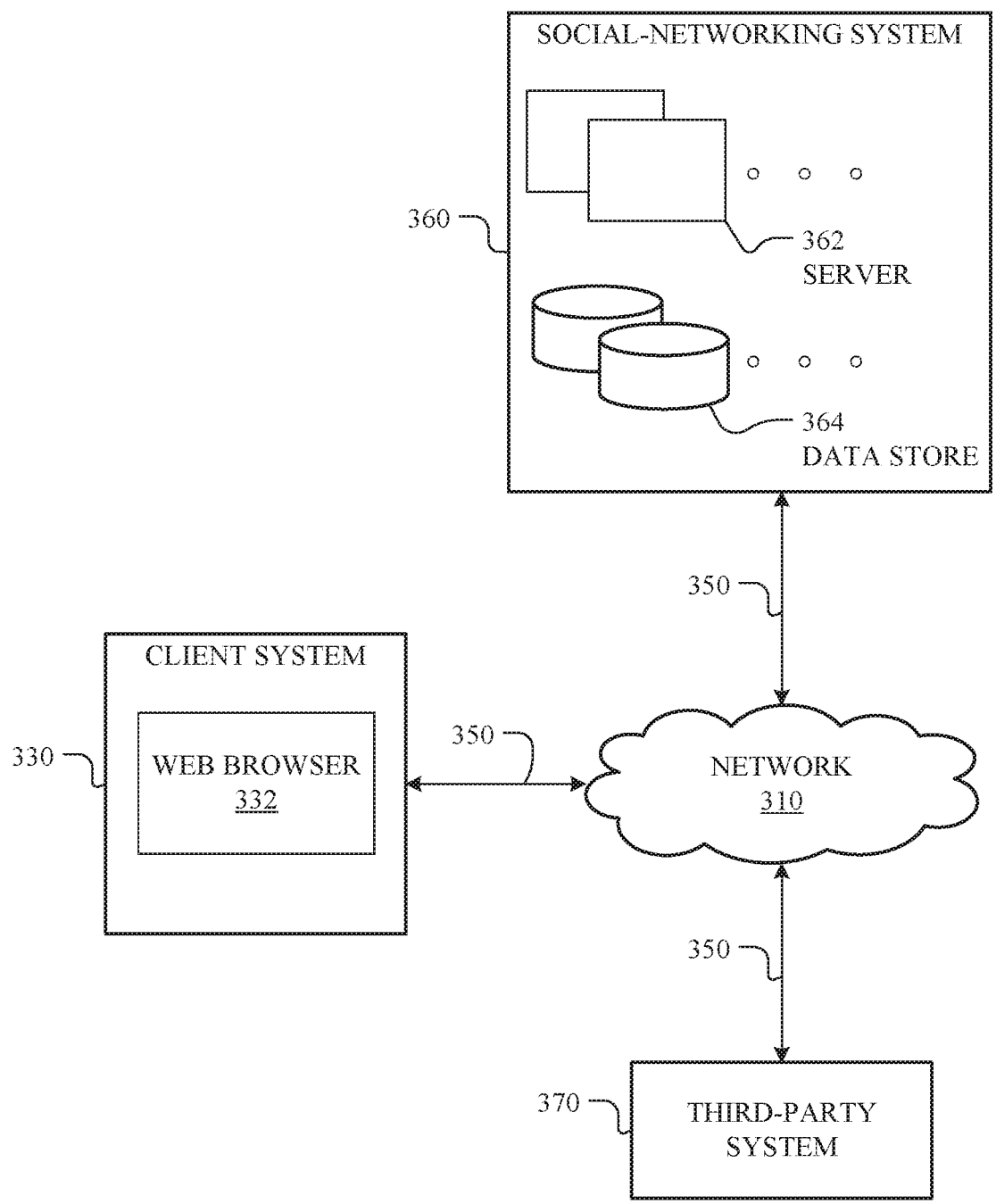
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example and not by way of limitation, client system 330 may access social-networking system 360 using a web browser 332, or a native application associated with social-networking system 360 (e.g., a mobile social-networking application, a messaging application, another suitable application, or any combination thereof) either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
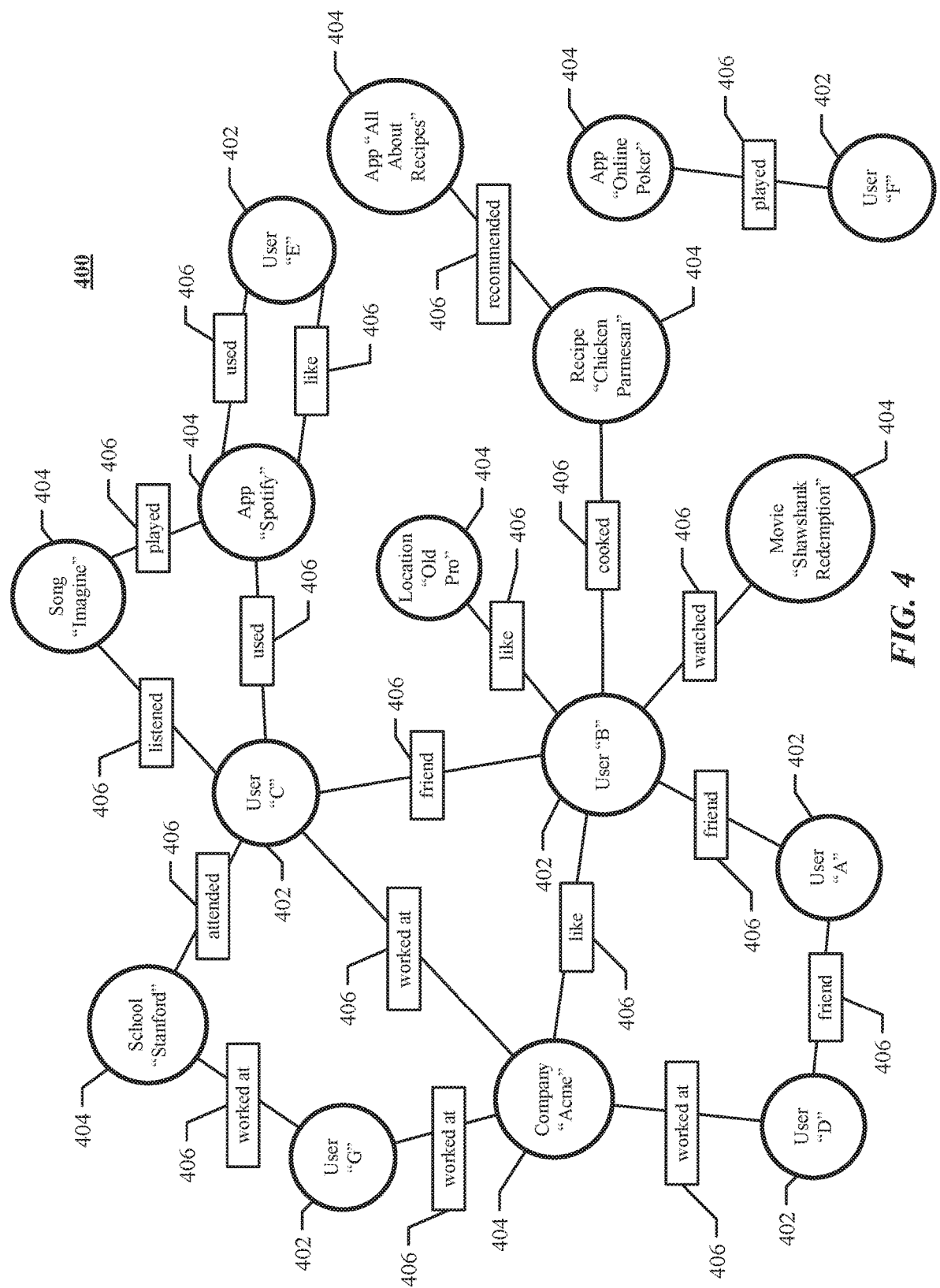
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, social-networking system 360 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 370 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 360 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 360 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 360 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 360 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 360 may calculate a coefficient based on a user's actions. Social-networking system 360 may monitor such actions on the online social network, on a third-party system 370, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 360 may calculate a coefficient based on the user's actions with particular types of content. The content may be associated with the online social network, a third-party system 370, or another suitable system. The content may include users, profile pages, posts, news stories, headlines, instant messages, chat room conversations, emails, advertisements, pictures, video, music, other suitable objects, or any combination thereof. Social-networking system 360 may analyze a user's actions to determine whether one or more of the actions indicate an affinity for subject matter, content, other users, and so forth. As an example and not by way of limitation, if a user frequently posts content related to "coffee" or variants thereof, social-networking system 360 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 360 may calculate a coefficient based on the type of relationship between particular objects. Referencing the social graph 400, social-networking system 360 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 360 may determine that the user has a higher coefficient with respect to the first photo than the second photo because having a tagged-in-type relationship with content may be assigned a higher weight and/or rating than having a like-type relationship with content. In particular embodiments, social-networking system 360 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 360 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 400. As an example and not by way of limitation, social-graph entities that are closer in the social graph 400 (i.e., fewer degrees of separation) may have a higher coefficient than entities that are further apart in the social graph 400.

In particular embodiments, social-networking system 360 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 330 of the user). A first user may be more interested in other users or concepts that are closer to the first user. As an example and not by way of limitation, if a user is one mile from an airport and two miles from a gas station, social-networking system 360 may determine that the user has a higher coefficient for the airport than the gas station based on the proximity of the airport to the user.

In particular embodiments, social-networking system 360 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 360 may provide information that is relevant to user's interests and current circumstances, increasing the likelihood that they will find such information of interest. In particular embodiments, social-networking system 360 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 360 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 360 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 370 (e.g., via an API or other communication channel), or from another suitable system. In response to the request, social-networking system 360 may calculate the coefficient (or access the coefficient information if it has previously been calculated and stored). In particular embodiments, social-networking system 360 may measure an affinity with respect to a particular process. Different processes (both internal and external to the online social network) may request a coefficient for a particular object or set of objects. Social-networking system 360 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 370). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 362 may be authorization/privacy servers for enforcing privacy settings. In response to a request from a user (or other entity) for a particular object stored in a data store 364, social-networking system 360 may send a request to the data store 364 for the object. The request may identify the user associated with the request and may only be sent to the user (or a client system 330 of the user) if the authorization server determines that the user is authorized to access the object based on the privacy settings associated with the object. If the requesting user is not authorized to access the object, the authorization server may prevent the requested object from being retrieved from the data store 364, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 5:
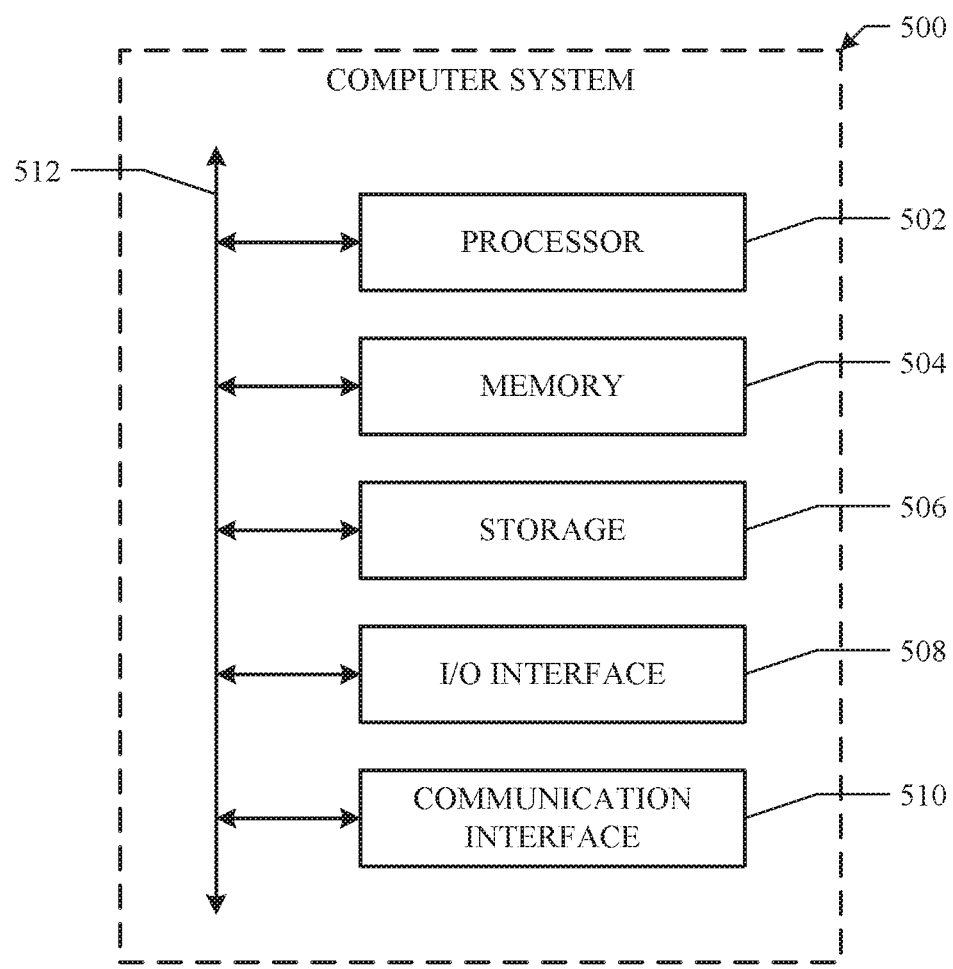
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing device, accessing a training data comprising a plurality of posts in a social-networking system that have been flagged by users of the social-networking system as being spam;
by the computing device, determining, for each of the plurality of posts, a posting user who submitted the post to the social-networking system and a recipient user to whom the post is addressed;
by the computing device, determining, for each of the plurality of posts, a first feature vector representation of the posting user and a second feature vector representation of the recipient user based on one or more features associated with the post, the posting user, and the recipient user;
by the computing device, comparing, for each of the plurality of posts, the first feature vector representation of the posting user to the second feature vector representation of the recipient user;
by the computing device, determining first feature vector representations of posting users associated with a subset of posts as sufficiently similar to second feature vector representations of recipient users associated with the subset of posts according to a predefined metric;
by the computing device, in response to determining the first feature vector representations of the posting users associated with the subset of posts as sufficiently similar to the second feature vector representations of the recipient users associated with the subset of posts, identifying the subset of posts as non-spam posts, without explicit user input, from the plurality of posts that have been flagged by the users of the social-networking system as being spam;
by the computing device, filtering the training data for training a machine learning model by removing the subset of posts that are identified as non-spam posts, without explicit user input, from the plurality of posts that have been flagged by the users of the social-networking system as being spam; and
by the computing device, using the filtered training data for training the machine learning model for automatically detecting a particular post in the social-networking system as spam or not spam.

2. The method of claim 1, wherein the recipient user is associated with a concept node in a social graph within the social-networking system.

3. The method of claim 1, wherein the predefined metric comprises a distance threshold between vectors in a multi-dimensional mapping space.

4. The method of claim 1, wherein the predefined metric comprises a particular pattern of interactions defined by each first and second feature vector representation.

5. The method of claim 1, wherein training the machine learning model further comprises using a second subset of the plurality of posts as spam training data, wherein each post in the second subset are determined to be sufficiently different using a second predefined metric.

6. The method of claim 1, wherein the first feature vector representation and the second feature vector representation of each post in the subset are determined to be sufficiently similar by mapping each feature vector representation in a d-dimensional embedding space.

7. The method of claim 1, wherein the plurality of posts that have been flagged by the users of the social-networking system as being spam is an indication by the users that the plurality of posts are unsolicited posts.

8. The method of claim 1, wherein generating the first and second feature vector representations for each of the plurality of posts comprises aggregating term embeddings associated with the post.

9. The method of claim 1, wherein the plurality of posts are NFX posts.

10. One or more computer-readable non-transitory storage media embodying software that is operable when executed to:
  access a training data comprising a plurality of posts in a social-networking system that have been flagged by users of the social-networking system as being spam;
  determine, for each of the plurality of posts, a posting user who submitted the post to the social-networking system and a recipient user to whom the post is addressed;
  determine, for each of the plurality of posts, a first feature vector representation of the posting user and a second feature vector representation of the recipient user based on one or more features associated with the post, the posting user, and the recipient user;
  compare, for each of the plurality of posts, the first feature vector representation of the posting user to the second feature vector representation of the recipient user;
  determine first feature vector representations of posting users associated with a subset of posts as sufficiently similar to second feature vector representations of recipient users associated with the subset of posts according to a predefined metric;
  in response to determining the first feature vector representations of the posting users associated with the subset of posts as sufficiently similar to the second feature vector representations of the recipient users associated with the subset of posts, identify the subset of posts as non-spam posts, without explicit user input, from the plurality of posts that have been flagged by the users of the social-networking system as being spam;
  filter the training data for training a machine learning model by removing the subset of posts that are identified as non-spam posts, without explicit user input, from the plurality of posts that have been flagged by the users of the social-networking system as being spam; and
  use the filtered training data to train the machine learning model for automatically detecting spam posts a particular post in the social-networking system as spam or not spam.

11. The media of claim 10, wherein the recipient user is associated with a concept node in a social graph within the social-networking system.

12. The media of claim 10, wherein the predefined metric comprises a distance threshold between vectors in a multi-dimensional mapping space.

13. The media of claim 10, wherein the predefined metric comprises a particular pattern of interactions defined by each first and second feature vector representation.

14. The media of claim 10, wherein training the machine learning model further comprises using a second subset of the plurality of posts as spam training data, wherein each post in the second subset are determined to be sufficiently different using a second predefined metric.

15. The media of claim 10, wherein the first feature vector representation and the second feature vector representation of each post in the subset are determined to be sufficiently similar by mapping each feature vector representation in a d-dimensional embedding space.

16. The media of claim 10, wherein the plurality of posts that have been flagged by the users of the social-networking system as being spam is an indication by the users that the plurality of posts are unsolicited posts.

17. The media of claim 10, wherein generating the first and second feature vector representations for each of the plurality of posts comprises aggregating term embeddings associated with the post.

18. A system comprising:
  one or more processors; and
  one or more computer-readable non-transitory storage media coupled to one or more of the processors and comprising instructions operable when executed by one or more of the processors to cause the system to:
    access a training data comprising a plurality of posts in a social-networking system that have been flagged by users of the social-networking system as being spam;
    determine, for each of the plurality of posts, a posting user who submitted the post to the social-networking system and a recipient user to whom the post is addressed;
    determine, for each of the plurality of posts, a first feature vector representation of the posting user and a second feature vector representation of the recipient user based on one or more features associated with the post, the posting user, and the recipient user;
    compare, for each of the plurality of posts, the first feature vector representation of the posting user to the second feature vector representation of the recipient user;
    determine first feature vector representations of posting users associated with a subset of posts as sufficiently similar to second feature vector representations of recipient users associated with the subset of posts according to a predefined metric;
    in response to determining the first feature vector representations of the posting users associated with the subset of posts as sufficiently similar to the second feature vector representations of the recipient users associated with the subset of posts, identify the subset of posts as non-spam posts, without explicit user input, from the plurality of posts that have been flagged by the users of the social-networking system as being spam;
    filter the training data for training a machine learning model by removing the subset of posts that are identified as non-spam posts, without explicit user input, from the plurality of posts that have been flagged by the users of the social-networking system as being spam; and
    use the filtered training data to train the machine learning model for automatically detecting a particular post in the social-networking system as spam or not spam.

19. The system of claim 18, wherein training the machine learning model further comprises using a second subset of the plurality of posts as spam training data, wherein each post in the second subset are determined to be sufficiently different using a second predefined metric.

20. The system of claim 18, wherein the first feature vector representation and the second feature vector representation of each post in the subset are determined to be sufficiently similar by mapping each feature vector representation in a d-dimensional embedding space.

* * * * *